United States Patent
Geddam et al.

(10) Patent No.: US 9,600,180 B2
(45) Date of Patent: Mar. 21, 2017

(54) DYNAMIC HIERARCHICAL NAVIGATION SCHEMES FOR STORAGE MANAGEMENT SYSTEMS

(71) Applicant: NETAPP, INC., Sunnyvale, CA (US)

(72) Inventors: Kishore Geddam, Bangalore (IN); Sidhartha Sankar Sutar, Bangalore (IN); Udit Khandelwal, Kolkata (IN)

(73) Assignee: NETAPP, INC., Sunnyvale, CA (US)

( * ) Notice: Subject to any disclaimer, the term of this patent is extended or adjusted under 35 U.S.C. 154(b) by 70 days.

(21) Appl. No.: 14/517,040

(22) Filed: Oct. 17, 2014

(65) Prior Publication Data

US 2016/0109240 A1    Apr. 21, 2016

(51) Int. Cl.
*G06F 7/00* (2006.01)
*G06F 17/00* (2006.01)
*G06F 3/06* (2006.01)

(52) U.S. Cl.
CPC .......... *G06F 3/0601* (2013.01); *G06F 3/0685* (2013.01); *G06F 3/0683* (2013.01)

(58) Field of Classification Search
CPC ........ G06T 3/048; G01C 21/32; G06Q 50/12; G06F 3/0865; G06F 17/30067; G06F 3/0685; G06F 17/00
USPC ........................................ 707/740, 778, 829
See application file for complete search history.

(56) References Cited

U.S. PATENT DOCUMENTS

| | | | |
|---|---|---|---|
| 8,560,970 B2 | 10/2013 | Liddington | |
| 2009/0164946 A1* | 6/2009 | Liddington | 715/853 |
| 2010/0306259 A1 | 12/2010 | Svinth | |
| 2013/0159108 A1* | 6/2013 | DesRosiers | 705/14.57 |
| 2014/0081906 A1* | 3/2014 | Geddam et al. | 707/609 |
| 2015/0074114 A1* | 3/2015 | Saito | G06Q 30/06 707/740 |

FOREIGN PATENT DOCUMENTS

| | | |
|---|---|---|
| EP | 2595054 | 5/2013 |
| WO | WO 01/96994 | 12/2001 |
| WO | WO2005/017670 | 2/2005 |
| WO | WO2006/101507 | 9/2006 |
| WO | WO2009/054731 | 4/2009 |

* cited by examiner

*Primary Examiner* — Isaac Smith
(74) *Attorney, Agent, or Firm* — Klein, O'Neill & Singh, LLP

(57) ABSTRACT

Methods, systems, and machine-readable medium are disclosed for creating and providing dynamic hierarchical navigation schemes in storage management systems. A mapping data structure is maintained to store hierarchical relationship mapping within a storage management system, allowing users to customize their interactions with the storage system. The method, includes receiving a user-defined navigation preference to view an attribute of a second storage object from a navigation screen defined for a first storage object; updating a mapping data structure for storing a hierarchical relationship of a second storage object, based on the user-defined navigation preference; and presenting the attribute of the second storage object at the navigation screen for the first storage object.

21 Claims, 8 Drawing Sheets

DYNAMIC HIERARCHICAL NAVIGATION SCHEMES FOR STORAGE MANAGEMENT SYSTEMS

TECHNICAL FIELD

The present disclosure relates to storage systems and more particularly, to the management of storage systems through user-defined navigation.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

These storage systems can often be large and complex systems, including clusters which have multiple nodes, each node presenting multiple virtual servers that may use multiple storage volumes that are based on storage space at various physical storage devices. As storage systems get more and more complex, it is important to have a management application that can help IT or data center managers to oversee and effectively manage the storage systems. Within such a management application and storage system, information about the system itself is subject to categorization and sub-categorization, often for many levels, thereby creating a detailed hierarchy. The management application is typically closely tied to this hierarchy. Navigation and use of the management application can become context sensitive and rigid.

At the same time, however, small storage units, for example, may be categorized from both logical and physical points of view. While some management application users may be more used to the logical point of view, others may be more comfortable understanding the storage system from a physical point of view. This problem can be compounded because various parts of the storage systems may be supplied by different vendors all having their own perspective for certain aspects of the system. As such, it can become a complex task simply to remember the way a storage hierarchy is set up and to drill down from a top level to the data that is of interest.

A solution that allows quick access to relevant information regarding storage within the complex hierarchy without the user having to learn and navigate the context sensitive hierarchy is needed.

SUMMARY

In one aspect, a machine implemented method is provided. The method includes receiving a user-defined navigation preference to view an attribute of a second storage object from a navigation screen defined for a first storage object; updating a mapping data structure for storing a hierarchical relationship of a second storage object, based on the user-defined navigation preference; and presenting the attribute of the second storage object at the navigation screen for the first storage object.

In another aspect, a non-transitory, machine readable storage medium having stored thereon instructions for performing a method comprising machine executable code. The machine executable code which when executed by at least one machine, causes the machine to: receive a user-defined navigation preference to view an attribute of a second storage object from a navigation screen defined for a first storage object; update a mapping data structure for storing a hierarchical relationship between the first storage object and the of a second storage object, based on the user-defined navigation preference; and present the attribute of the second storage object at the navigation screen for the first storage object.

In yet another aspect, a system having a memory containing machine readable medium comprising machine executable code having stored thereon instructions; and a processor module coupled to the memory are provided. The processor module is configured to execute the machine executable code to: receive a user-defined navigation preference to view an attribute of a second storage object from a navigation screen defined for a first storage object; update a mapping data structure for storing a hierarchical relationship between the first storage object and the of a second storage object, based on the user-defined navigation preference; and present the attribute of the second storage object at the navigation screen for the first storage object.

This brief summary has been provided so that the nature of this disclosure may be understood quickly. A more complete understanding of the disclosure can be obtained by reference to the following detailed description of the various thereof in connection with the attached drawings.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Methods, systems, and machine-readable medium are disclosed for creating and providing dynamic hierarchical navigation schemes in storage management systems. A mapping data structure is maintained to store hierarchical relationship mapping within a storage management system, allowing users to customize their interactions with the storage system. The method, includes receiving a user-defined navigation preference to view an attribute of a second storage object from a navigation screen defined for a first storage object; updating a mapping data structure for storing a hierarchical relationship of a second storage object, based on the user-defined navigation preference; and presenting the attribute of the second storage object at the navigation screen for the first storage object.

Figure 1A:
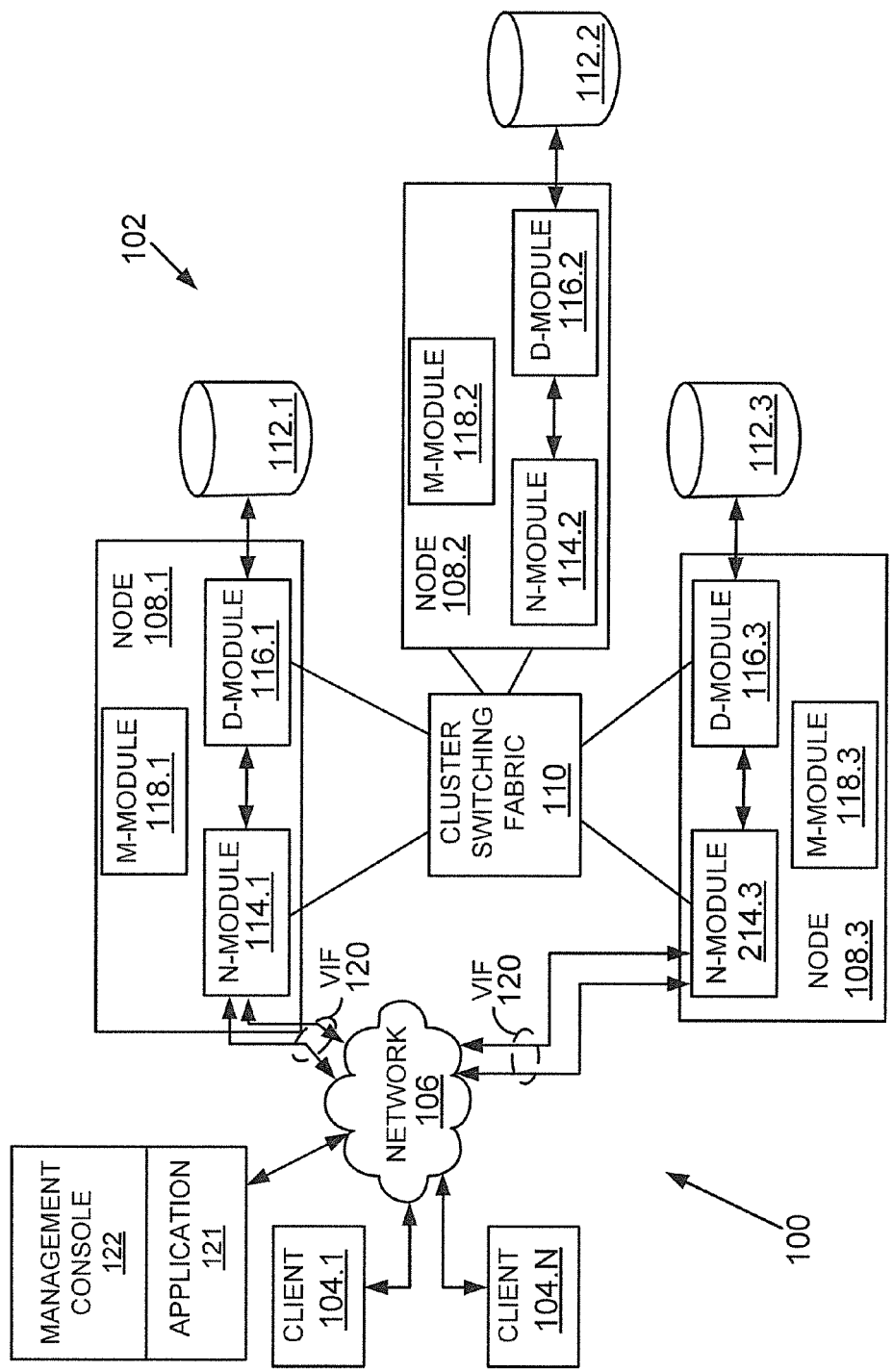
FIG. 1A shows an example of an operating environment for the various aspects disclosed herein.

Clustered System:

FIG. 1A shows a cluster based storage environment 100 having a plurality of nodes 108.1-108.3 where the various aspects disclosed herein can be implemented. Of course, the number of nodes may vary in any given system without affecting the ideas of the present disclosure. Storage environment 100 may include a plurality of client computing systems (also referred to as a client system or client) 104.1-104.N, a clustered storage system 102 and at least a network 106 communicably connecting the client systems 104.1-104.N and the clustered storage system 102.

In the illustrated aspect, the clustered storage system 102 includes a plurality of nodes 108.1-108.3 executing a plurality of modules, a cluster switching fabric 110, and a plurality of mass storage devices 112.1-112.3 (may be also be referred to as 112). The mass storage devices 112 may include writable storage device media such as magnetic disks, video tape, optical, DVD, magnetic tape, non-volatile memory devices for example, self-encrypting drives, flash memory devices, solid state storage drives (SSDs), combinations of the same, and any other similar media adapted to store information. The storage devices 112 may be organized as one or more groups of Redundant Array of Independent (or Inexpensive) Disks (RAID). The aspects disclosed are not limited to any particular storage device or storage device configuration.

The storage system 102 provides a set of storage volumes to clients for storing information at storage devices 112. A storage operating system executed by the nodes of storage system 102 present or export data stored at storage devices 112 as a volume, or one or more qtree sub-volume units. Each volume may be configured to store data files (or data containers or data objects), scripts, word processing documents, executable programs, and any other type of structured or unstructured data. From the perspective of client systems, each volume can appear to be a single storage drive. However, each volume can represent the storage space in a portion of a storage device, one storage device, an aggregate of some or all of the storage space in multiple storage devices, a RAID group, or any other suitable set of storage space.

The storage system 102 may be used to store and manage information at storage devices 112 based on a client request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

Each of the plurality of nodes 108.1-108.3 is configured to include an N-module, a D-module, and an M-Module, each of which can be implemented as a processor executable module. For example, node 108.1 includes N-module 114.1, D-module 116.1, and M-Module 118.1, node 108.2 includes N-module 114.2, D-module 116.2, and M-Module 118.2, and node 108.3 includes N-module 114.3, D-module 116.3, and M-Module 118.3.

The N-modules 114.1-114.3 include functionality that enable the respective nodes 108.1-108.3 to connect to one or more of the client systems 104.1-104.N over network 106 and with other nodes via switching fabric 110. The D-modules 116.1-116.3 connect to one or more of the storage devices 112.1-112.3. The M-Modules 118.1-118.3 provide management functions for the clustered storage system 102.

A switched virtualization layer including a plurality of virtual interfaces (VIFs) 120 is provided to interface between the respective N-modules 114.1-114.3 and the client systems 104.1-104.N, allowing storage 112.1-112.3 associated with the nodes 108.1-108.3 to be presented to the client systems 104.1-104.N as a single shared storage pool.

In one aspect, the clustered storage system 102 can be organized into any suitable number of virtual servers (may also be referred to as "VServers" or virtual storage machines). A VServer is a virtual representation of a physical storage controller/system and is presented to a client system for storing information at storage devices 112. Each VServer represents a single storage system namespace with independent network access. Each VServer has a user domain and a security domain that are separate from the user and security domains of other VServers. Moreover, each VServer is associated with one or more VIFs 120 and can span one or more physical nodes, each of which can hold one or more VIFs 120 and storage associated with one or more VServers. Client systems can access the data on a VServer from any node of the clustered system through the VIFs associated with that VServer.

Each of the nodes 108.1-108.3 is defined as a computing system to provide application services to one or more of the client systems 104.1-104.N. The nodes 108.1-108.3 are interconnected by the switching fabric 110, which, for example, may be embodied as a switch or any other type of connecting device.

Although FIG. 1A depicts an equal number (i.e., 3) of the N-modules 114.1-114.3, the D-modules 116.1-116.3, and the M-Modules 118.1-118.3, any other suitable number of N-modules, D-modules, and M-Modules may be provided. There may also be different numbers of N-modules, D-modules, and/or M-Modules within the clustered storage system 102. For example, in alternative aspects, the clustered storage system 102 may include a plurality of N-modules and a plurality of D-modules interconnected in a configuration that does not reflect a one-to-one correspondence between the N-modules and D-modules.

Each client system may request the services of one of the respective nodes 108.1, 108.2, 108.3, and that node may return the results of the services requested by the client system by exchanging packets over the computer network 106, which may be wire-based, optical fiber, wireless, any other suitable combination thereof, or the like. The client systems may issue packets according to file-based access protocols, such as the NFS or CIFS protocol, when accessing information in the form of files and directories.

System 100 also includes a management console 122 executing a management application 121 out of a memory. Management console 122 may be used to configure and manage various elements of system 100.

Figure 1B:
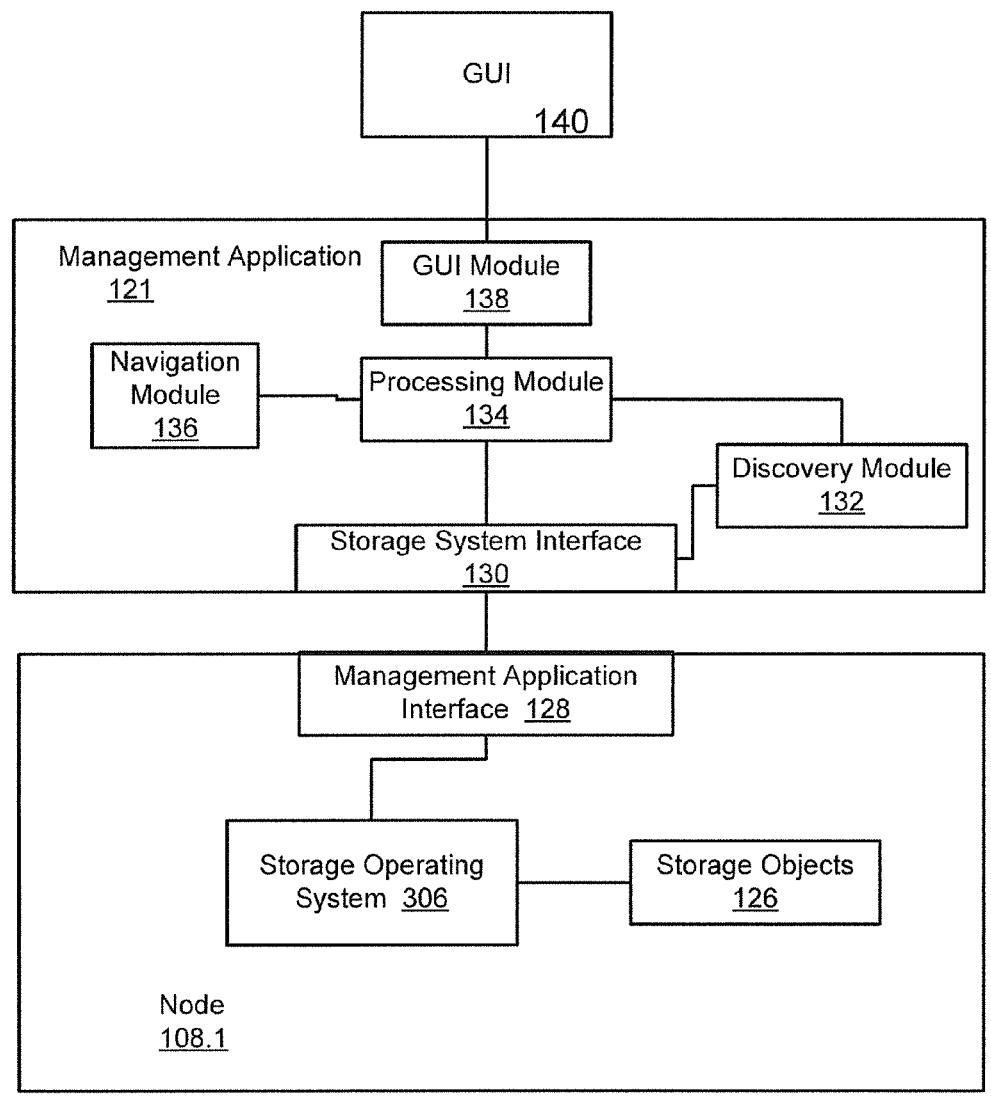
FIG. 1B shows a block diagram of a management application in communication with a storage node according to one aspect of the present disclosure.

FIG. 1B illustrates a block diagram of a management application 121 and associated modules executed by management console 122, in one aspect. In an aspect, the illustrated blocks are processor executable modules that can be run on hardware as described below with reference to FIG. 5. However, one of skill in the art will understand that elements of FIG. 1B may be implemented in hardware and/or software in various combinations.

Management application 121 is extensively used by IT and data storage managers, particularly as storage systems get more and more complex. In an aspect according to the present disclosure, management application 121 interacts with storage system nodes 108.1 through network 106 (see FIG. 1A). In an aspect, the node 108.1 includes the storage operating system 306 (as described in more detail with respect to FIG. 3) which maintains storage objects 126, containing information about the storage system elements (described in more detail below with respect to FIG. 1D). The storage operating system 306 further communicates with a management application interface module 128, which is used to process communications to and from management application 121, through network 106 and a storage system interface module 130, operating at management application 121.

Management application 121 includes a processing module 134, which communicates with and coordinates operations of other modules of the management application 121. Specifically, these other modules may include, in an aspect, a discovery module 132, a navigation module 136, and a Graphic User Interface (GUI) module 138. The GUI module 138 provides the GUI 140 on a monitor or other display for interaction with the IT user or storage manager. The discovery module 132 communicates with the storage operating system 306 to retrieve information from the storage objects 126, such as for display in GUI 140.

The navigation module 136 interacts with the user through the GUI to help process user requests and create dynamic navigation as described more fully herein. In an aspect, the GUI module 138 may comprise a web browser for viewing data delivered to, or by, discovery module 132 as a URL. In one aspect, the navigation module 136 may comprise a web server and create records from storage objects 126 and provides a URL to the discovery module 132. The discovery module 132 collects information regarding storage objects 126 from the storage operating system 306 and provides the collected data to navigation module 136. In another aspect, storage operating system 306 sends information related to the storage objects 126 to discovery module 132, which then creates a record and URL for processing module 134.

In yet another aspect, information is passed through to the GUI module 138. It should be further noted that in some aspects information is presented through a command line interface (CLI) and/or through various visual or non-visual means. For example, information may be presented to a user aurally and/or visually.

Figure 1C:
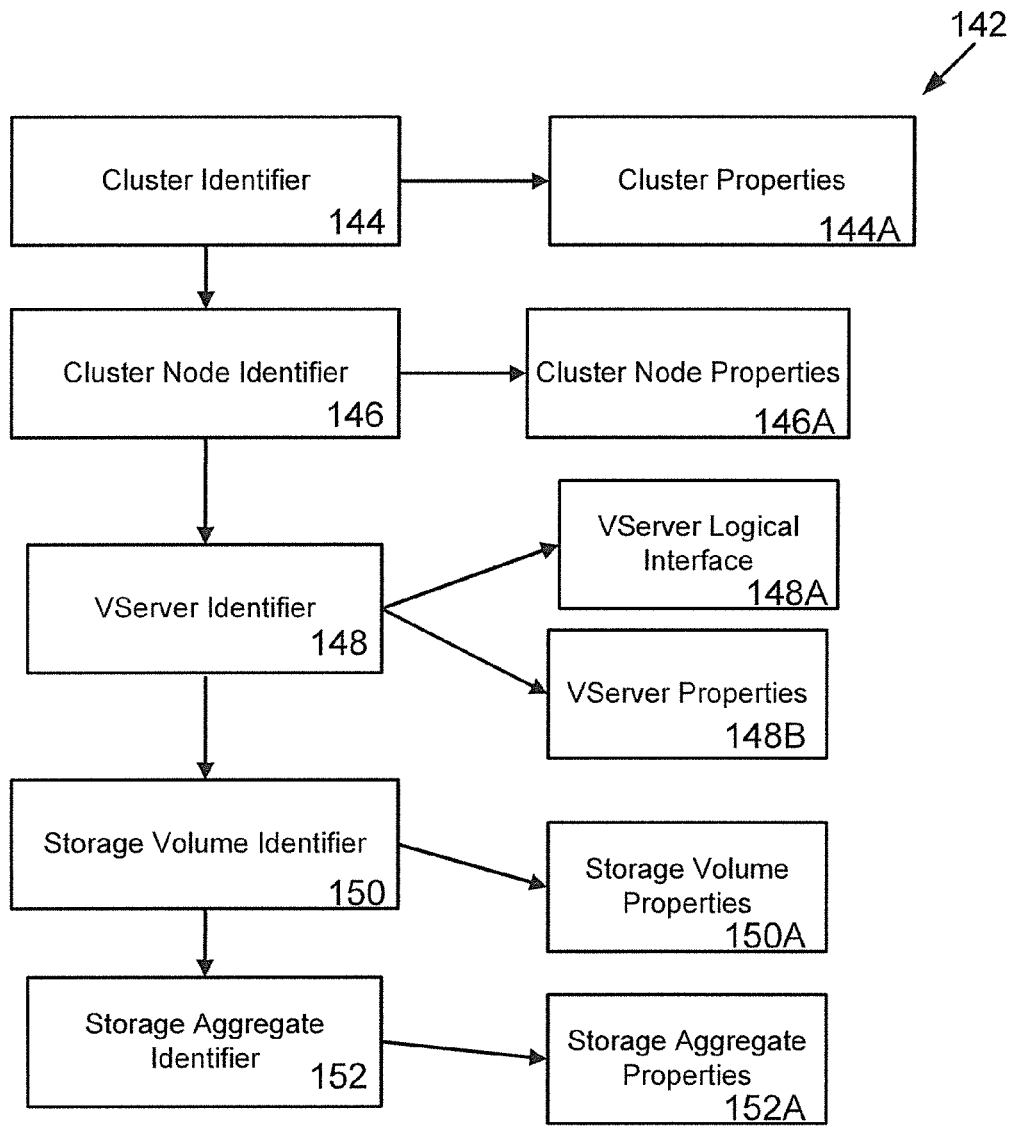
FIG. 1C illustrates a storage data hierarchy as may be maintained by a storage node's operating system in accordance with an aspect of the present disclosure.

Next the information relevant to the management application 121 as disclosed herein is described. FIG. 1C illustrates an exemplary storage hierarchy 142 that is maintained by storage operating system 306, such as at a node 108.1. Any or all of the elements of the hierarchy described herein may also be classified as storage objects 126 mentioned above with respect to FIG. 1B. First, the hierarchy identifies a cluster to which it belongs with a cluster identifier 144. The storage operating system also maintains cluster properties 144A that pertain to the cluster. Cluster properties 144A may include information such as the number of nodes in a cluster, the number and identity of clients that are allowed to access the cluster, and other information associated with the cluster. As described above, within a cluster, there are nodes (108.*), so there will be node identifiers 146 associated with the cluster identifier 144, and each cluster node will have associated cluster node properties 146A.

Cluster nodes may then have one or more VServers associated with them, which can be associated in the storage hierarchy by VServer Identifier(s) 148. VServer's then have at least one logical interface (LIF) 148A associated with them, as well as VServer properties 148B (which may include, for example, which business group owns/controls the VServer, special properties of the VServer, access rights and limitations, and so on). The VServer(s) then have storage volumes associated with them that are identified by storage volume identifiers 150. As described above, storage volumes are logical objects that are presented to a client and are associated with physical storage in some way, which may include one or more LUNs, NAS storage, or the like. Storage volume identifiers are then associated with storage volume properties 150A, such as, for example, storage size, back-up time frames, and so on.

Storage volume identifier 150 further have storage aggregate identifiers 152. Storage aggregate is a logical object for managing physical storage. Additionally, storage aggregate identifiers 152 have storage aggregate properties 152A, which may include, for example, what physical storage locations are included in the aggregate, the size, which storage controller and which storage devices include the physical storage, etc. An "aggregate" is a pool of storage that combines one or more physical mass storage devices (e.g., disks) or parts thereof into a single logical storage object. An aggregate contains or provides storage for one or more other logical data sets at a higher level of abstraction, e.g., volumes.

This logical structure provides a great deal of information for storage managers overseeing the systems, but in order to determine certain storage aggregate properties, for example, a manager must start at the Cluster identifier 144 and drill down through multiple pages to get to the aggregate properties of interest.

Figure 1D:
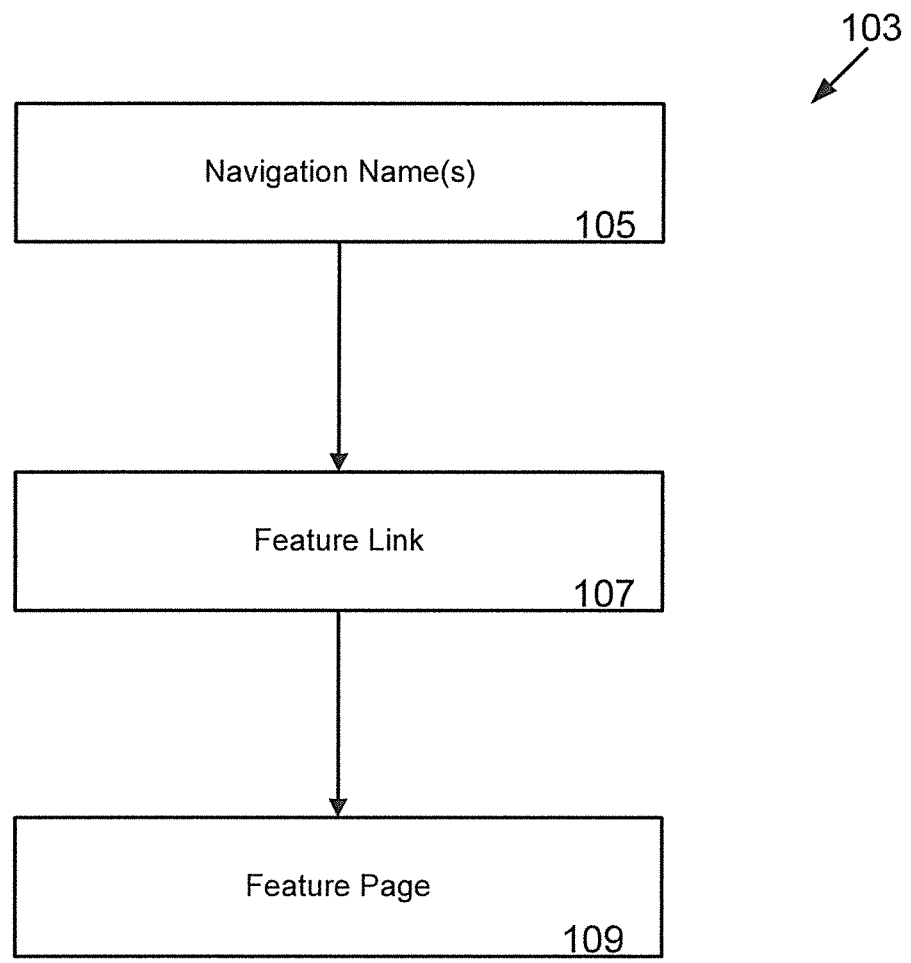
FIG. 1D illustrates a rigid navigation topography of the prior art.

FIG. 1D illustrates a rigid, conventional system for providing storage related information to a user. In conventional systems, management applications provided navigation in a contextual manner within the storage hierarchy. A GUI may present different feature pages 109 to a user, based on a feature link 107, which could be a URL provided by a webserver, for example. A feature page may provide information about storage aggregate properties 152A, for example; more specifically, for example, a feature page may display the names, sizes, and locations of the physical storage devices making up a storage aggregate 152.

In conventional systems, such a feature page 109 would be accessible to a user based on one or more navigation names 105, such as "Storage Location." However, the GUI would display the navigation name 105 to a user only within specific contexts of the storage hierarchy. Thus, a user has to remember how to get to a specific context to obtain access to the navigation name, and the feature page, that they are interested in viewing. For example, each feature page 109 may have been populated using a Zephyr Application Programming Interface (ZAPI). In such a case, a property object is used as a parameter in a ZAPI call. This property object thus defined the context, and the mechanism to arrive at a feature page had to be hard-coded, which makes the conventional systems rigid and undesirable.

Figure 1E:
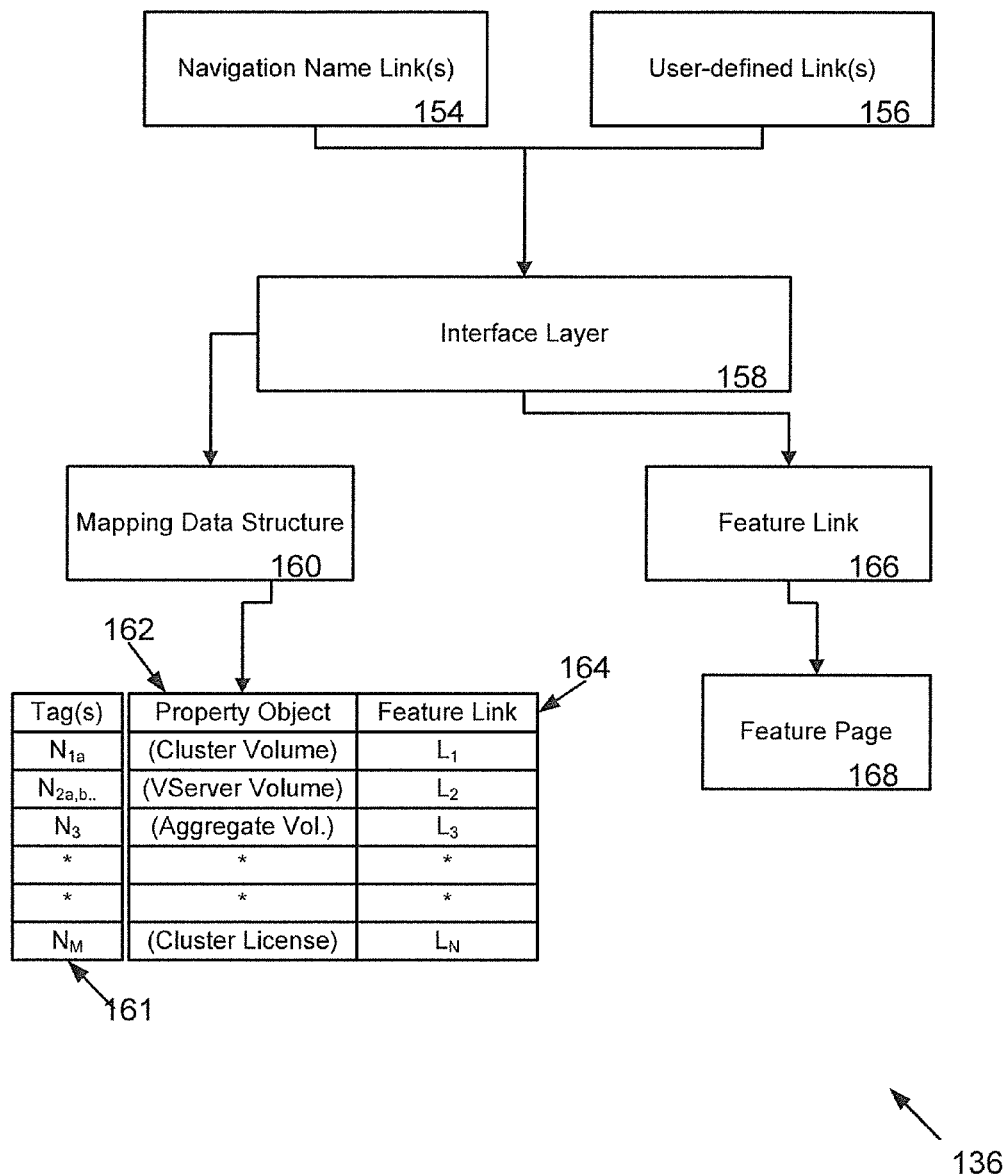
FIG. 1E illustrates a block diagram of a dynamic navigation system for navigating a hierarchy according to an aspect of the present disclosure.

The present disclosure provides a navigation module 136, mentioned above, and described in more detail with respect to FIG. 1E. In the aspect described in FIG. 1E, the navigation module 136 includes an interface layer 158 that provides a mapping data structure 160 that can be used not only to display feature pages 168 to the user based on context-specific navigation name links 154, but also can learn user-defined links 156 and provide more ready access to the information that a user wishes to access.

In one aspect, mapping data structure 160 includes a data structure (for example, a table) that maps one or more tags 161 ($N_{1a}$, $N_{2a,b}$ . . . , . . . $N_M$) to a property object 162 and a feature link 164. The tag 161 is defined by the user's preferences, and the property object 162 stores an indication of the hierarchy navigation to the feature link 164 desired by the user. In an aspect, multiple tags 161 (for example, $N_{2a}$ and $N_{2b}$) may map to the same property object 162 and/or feature link 164. This may allow different users to define their own tags, for example. With multiple users, further information may be stored in mapping data structure 160 to allow display of tags that are associated with that current user and/or hide display of tags associated with another user.

Figure 2A:
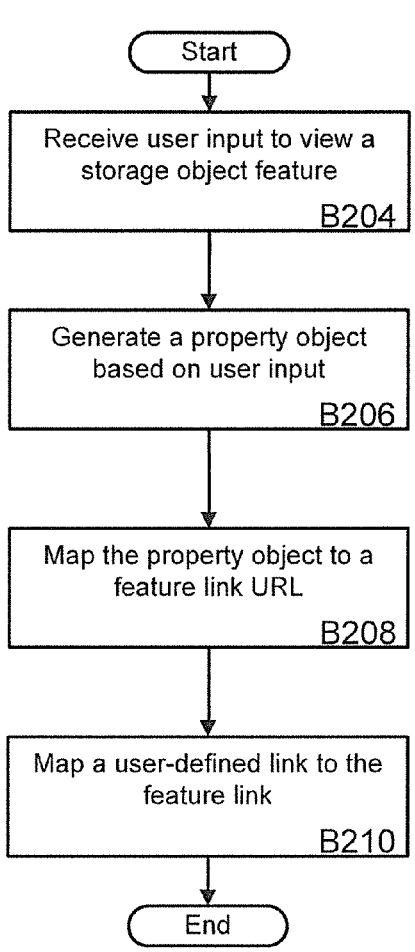
FIG. 2A illustrates a process flow diagram for dynamic storage feature mapping according to an aspect of the present disclosure.

FIG. 2A illustrates an exemplary process flow for creating a mapping data structure 160 as set forth in FIG. 1E. In an aspect, starting with user input to view a storage object feature (in Block B204). In one aspect, this may include a user drilling down through the storage hierarchy to get to the information that the user wants to be able to access more easily at a later time. At block B206, a property object 160 is generated based on that user input. At block B208, the property object is mapped to a feature link 164, which may be a URL, as described herein. Additionally, at block B210, the property object 160 is mapped to a tag 161 to create a user-defined link. The tag, in an aspect, is a shorthand notation or name that the user will easily associate with the information that they are trying to view. In another aspect, the tag is a URL. In an aspect, the tag 161 can then be displayed to the user as part of the GUI in the form of a button, a link, a menu item, or the like for quick navigation at a later time.

Figure 2B:
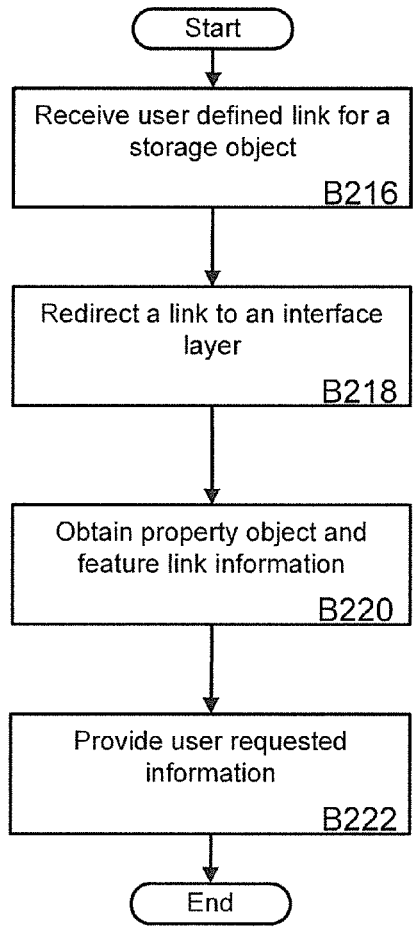
FIG. 2B illustrates a process flow diagram for handling a user request

FIG. 2B then illustrates an aspect of how a system or navigation module 136 can retrieve appropriate information based on a user-defined link 156. At block 3216, an indication of the user-defined link is received, such as from user input to a GUI. In an aspect, this may be a tag 161. At block 3218, the user-defined link or tag is directed to the interface layer 158. The interface layer processes the link or tag using mapping data structure 160 to retrieve the property object and feature link information (block B220). At block 3222, the feature link 164 is used to process and display the feature page 166 to the user. In an aspect, block B222 includes dynamic processing of the property object 164 to ensure that changes to the system between the last link access and the current request are reflected in the feature page displayed to the user. For example, in an aspect, the property object 164 is used as a parameter of the feature link 166 to generate the feature page 168. In another aspect, the feature link 164 is simply used to request information and the storage operating system 306 processes the link to generate the feature page.

With reference to FIGS. 1E, 2A, and 2B, user-defined links 156 may be defined in various ways according to different aspects without detracting from the spirit of the present disclosure. For example, a user-defined link 156 and a tag 161 may be the same or may be indications of the same thing in an aspect. In another aspect, property object 162 may include sufficient information to navigate a storage hierarchy and locate a feature link 164 on the fly, without storing a feature link 164 in the mapping data structure. Contrarily, a feature link 164 may be sufficient to link to the feature page that a user wants to see without having to know the storage hierarchy path that a property object 162 might represent. As such, in one aspect, tags 161 and feature links 164 are mapped in data structure 160 without a property object 162.

In yet another aspect, a property object 162 may be used for disambiguation, such as to keep the mapping data structure more streamlined. As described above, the complex storage systems may provide different paths to get to the same data, so two users may originally get to different information from different paths. If both create user-defined links, the interface layer may use the information of property object 162 to associate both tags with the same feature link 164 without storing the storage hierarchy paths of both users.

Figure 3:
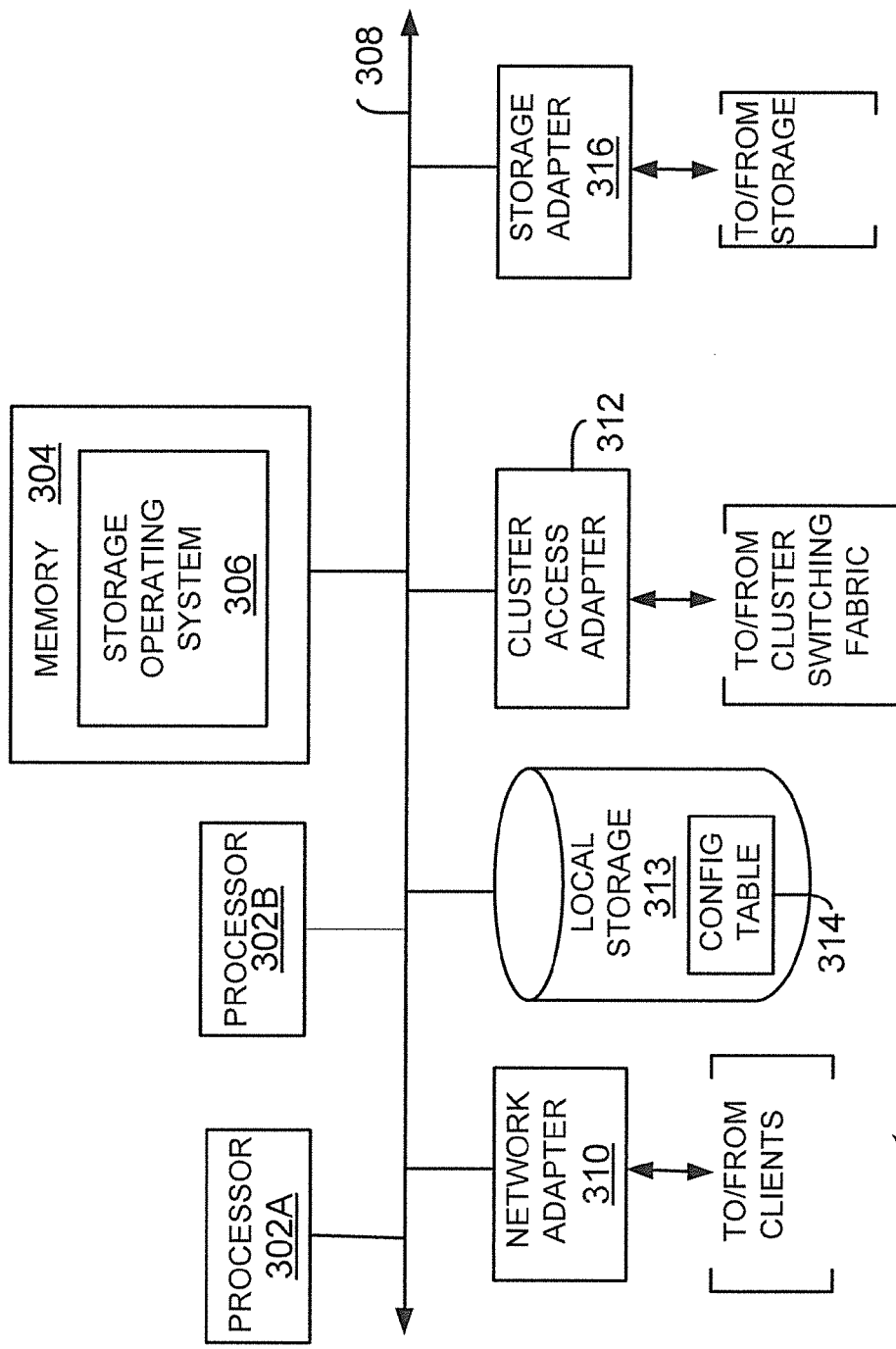
FIG. 3 is a block diagram of a storage node used in the cluster of FIG. 1A, according to one aspect of the present disclosure.

Storage System Node:

FIG. 3 is a block diagram of node 108.1 that is illustratively embodied as a storage system comprising a plurality of processors 302A and 302B, a memory 304, a network adapter 310, a cluster access adapter 312, a storage adapter 316 and local storage 313 interconnected by a system bus 308.

Processors 302A-302B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 313 comprises one or more storage devices utilized by the node to locally store configuration information for example, in a configuration data structure 314.

The cluster access adapter 312 comprises a plurality of ports adapted to couple node 108.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 312 is utilized by the N/D-module for communicating with other N/D-modules in the cluster 100/101.

Node 108.1 is illustratively embodied as a dual processor storage system executing a storage operating system 306 that preferably implements a high-level module, such as a file system, to logically organize the information as a hierarchical structure of named directories and files on storage 112. However, it will be apparent to those of ordinary skill in the art that the node 108.1 may alternatively comprise a single or more than two processor systems. Illustratively, one processor 302A executes the functions of the N-module 114 and M-module 118, while the other processor 302B executes the functions of the D-module 116. In another aspect, one processor executes the functions of M-module 118, while the other processor executes the functions of both D-module 116 and N-module 114. In yet another aspect, a dedicated processor (not shown) may be used to execute the functions of M-module 118.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the presented disclosure.

The storage operating system 306, portions of which are typically resident in memory and executed by the processing elements, functionally organizes the node 108.1 by, inter alia, invoking storage operation in support of the storage service implemented by the node.

The network adapter 310 comprises a plurality of ports adapted to couple the node 108.1 to one or more clients over point-to-point links, wide area networks, virtual private networks implemented over a public network (Internet) a shared local area network, or the like. The network adapter 310 thus may comprise the mechanical, electrical and signaling circuitry needed to connect the node to the network.

The storage adapter 316 cooperates with the storage operating system 306 executing on the node 108.1 to access information requested by the clients. The information may be stored on any type of attached array of writable storage device media such as video tape, optical, DVD, magnetic tape, bubble memory, electronic random access memory, micro-electro mechanical, magnetic disk, SSD, and any other similar media adapted to store information, including data and parity information. However, as illustratively described herein, the information is preferably stored on storage device 112. The storage adapter 316 comprises a plurality of ports having input/output (I/O) interface circuitry that couples to the storage devices over an I/O interconnect arrangement, such as a conventional high-performance, FC link topology.

Figure 4:
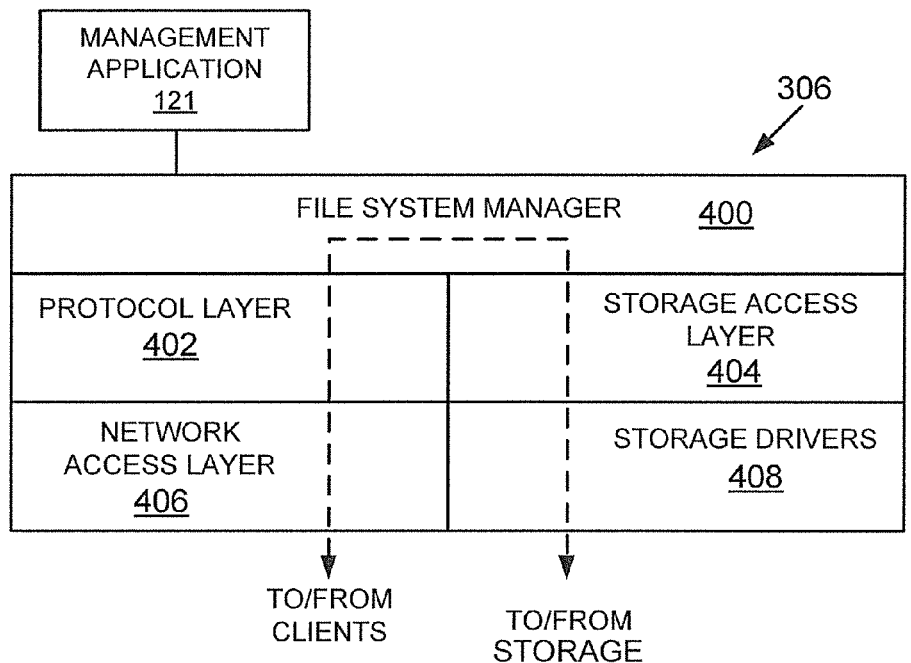
FIG. 4 illustrates a generic example of a storage operating system as may be utilized by aspects of the present disclosure.

Operating System:

FIG. 4 illustrates a generic example of storage operating system 306 executed by node 108.1, according to one aspect of the present disclosure. The storage operating system 306 interfaces with the management application 121 (through network 106). The storage operating system 306 maintains storage objects 126, as described above.

In one example, storage operating system 306 may include several modules, or "layers" executed by one or both of N-Module 114 and D-Module 116. These layers include a file system manager 400 that keeps track of a directory structure (hierarchy) of the data stored in storage devices and manages read/write operation, i.e. executes read/write operation on storage in response to client requests.

Storage operating system 306 may also include a protocol layer 402 and an associated network access layer 406, to allow node 108.1 to communicate over a network with other systems. Protocol layer 402 may implement one or more of various higher-level network protocols, such as NFS, CIFS, Hypertext Transfer Protocol (HTTP), TCP/IP and others, as described below.

Network access layer 406 may include one or more drivers, which implement one or more lower-level protocols to communicate over the network, such as Ethernet. Interactions between clients 104 and mass storage devices 112 are illustrated schematically as a path, which illustrates the flow of data through storage operating system 306.

The storage operating system 306 may also include a storage access layer 404 and an associated storage driver layer 408 to allow D-module 116 to communicate with a storage device. The storage access layer 404 may implement a higher-level storage protocol, such as RAID (redundant array of inexpensive disks), while the storage driver layer 408 may implement a lower-level storage device access protocol, such as FC or SCSI. The storage driver layer 408 may maintain various data structures (not shown) for storing information relating to LUN, storage volume, aggregate and various storage devices.

As used herein, the term "storage operating system" generally refers to the computer-executable code operable on a computer to perform a storage function that manages data access and may, in the case of a node 108.1, implement data access semantics of a general purpose operating system. The storage operating system can also be implemented as a microkernel, an application program operating over a general-purpose operating system, such as Linux, Apple® iOS, UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 5:
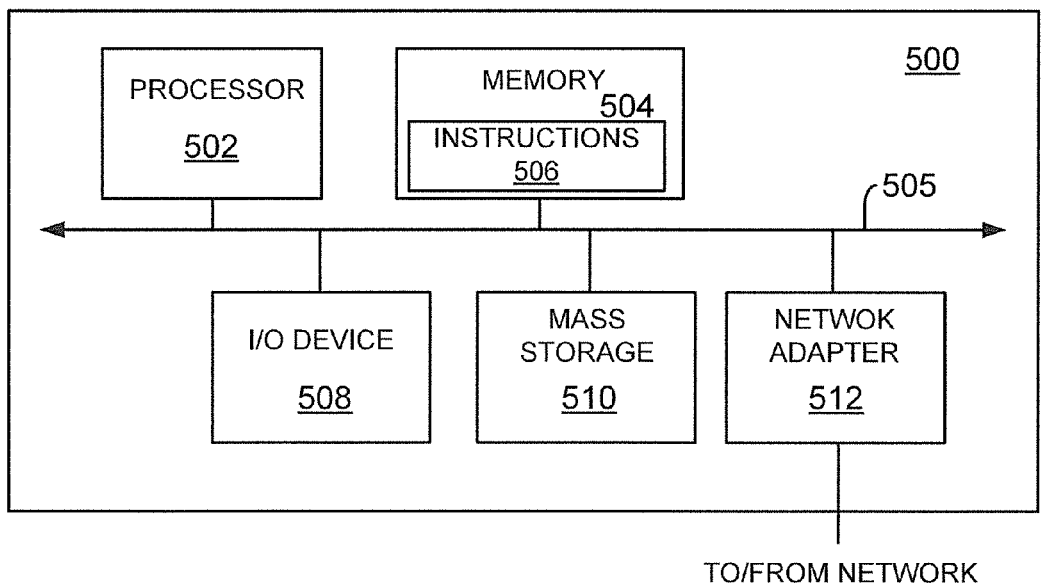
FIG. 5 shows an example of a processing system, used according to one aspect of the present disclosure.

Processing System:

FIG. 5 is a high-level block diagram showing an example of the architecture of a processing system 500 that may be used according to one aspect. The processing system 500 can represent the management console 122, a M-module 118, or a client 104. Note that certain standard and well-known components which are not germane to the present disclosure are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. In an aspect, instructions 506 implement the process steps described herein with respect to FIGS. 2A and 2B may reside in and be executed (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like. In some aspects, software, such as operating systems and/or applications (and which may embody instructions 506), are stored in mass storage devices 510 until preparing to be executed, at which time, they are loaded into memory 504.

The processing system 500 also includes one or more input/output (I/O) devices 508 coupled to the bus system 505. The I/O devices 508 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network (for example, the Internet or any other network type) to provide computing as a service.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, layers include a cloud platform and cloud infrastructure, followed by a "server" layer that includes hardware and computer software designed for cloud specific services.

Thus, methods and systems for creating dynamic hierarchical navigation schemes for storage management systems have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method for managing physical and logical elements of a storage system represented by a plurality of storage objects used for storing and retrieving data from a plurality of storage devices of the storage system, comprising:

generating a storage hierarchy by a storage operating system of the storage system using the plurality of storage objects, where each storage object represents an element of the storage system including a cluster having a plurality of cluster nodes, a plurality of virtual servers and a plurality of storage volumes for accessing the plurality of storage devices and a storage aggregate representing storage space at the plurality of storage device; wherein the storage hierarchy represents a plurality of relationships between the cluster, the plurality of cluster nodes, the plurality of virtual servers, the plurality of storage volumes and the storage aggregate;

receiving by a processor executable management application a user-defined navigation preference to view an attribute of a second storage object representing a second element of the storage system related to a first storage object representing a first element of the storage system within the storage hierarchy defined by the plurality of storage objects;

creating a property object by the processor executable management application for a mapping data structure for storing a hierarchical relationship of the second storage object with the first storage object within the storage hierarchy, based on the user-defined navigation preference;

associating the property object by the processor executable management application with a feature link and a tag at the mapping data structure, where the tag is a notation that the user associates with the attribute of the second storage object; wherein multiple, user defined tags map to the property object to view the attribute of the second object using the feature link; and presenting the tag by the processor executable management application at a navigation screen defined for the first storage object, where the tag identifies the feature link and the feature link allows navigation to a second navigation screen defined for the attribute of the second storage object based on the stored property object.

2. The machine implemented method of claim 1, wherein the attribute of the second storage object comprises information about the second storage object.

3. The machine implemented method of claim 1, wherein the first storage object comprises one of the following:
a storage node;
a virtual server;
a storage volume; or
a storage aggregate.

4. The machine implemented method of claim 1, wherein the hierarchical relationship between the first storage object and the second storage object varies based on a type of the first element and the second element.

5. The machine implemented method of claim 1, further comprising:
upon receiving a user request for the feature link, the processor executable management applications uses the mapping data structure to locate the second storage object, request information associated with the feature link from the second storage object, and display the information to the user.

6. The machine implemented method of claim 1, wherein presenting the tag of the second storage object at the navigation screen for the first storage object comprises displaying to a graphical user interface at least one of the following: a button, a menu item, or a link.

7. A non-transitory, machine readable storage medium having stored thereon instructions for performing a method for managing physical and logical elements of a storage system represented by a plurality of storage objects used for storing and retrieving data from a plurality of storage devices, comprising machine executable code which when executed by at least one machine, causes the machine to:
generate a storage hierarchy by a storage operating system of the storage system using the plurality of storage objects, where each storage object represents an element of the storage system including a cluster having a plurality of cluster nodes, a plurality of virtual servers and a plurality of storage volumes for accessing the plurality of storage devices and a storage aggregate representing storage space at the plurality of storage device; wherein the storage hierarchy represents a plurality of relationships between the cluster, the plurality of cluster nodes, the plurality of virtual servers, the plurality of storage volumes and the storage aggregate;

receive a user-defined navigation preference by a processor executable management application to view an attribute of a second storage object representing a second element of the storage system related to a first storage object representing a first element of the storage system within the storage hierarchy defined by the plurality of storage objects;

create a property object by the processor executable management application for a mapping data structure for storing a hierarchical relationship of the second storage object with the first storage object within the storage hierarchy, based on the user-defined navigation preference;

associate the property object by the processor executable management application with a feature link and a tag at the mapping data structure, where the tag is a notation that the user associates with the attribute of the second storage object; wherein multiple, user defined tags map to the property object to view the attribute of the second object using the feature link; and present the tag by the processor executable management application at a navigation screen defined for the first storage object, where the tag identifies the feature link and the feature link allows navigation to a second navigation screen defined for the attribute of the second storage object based on the stored property object.

8. The storage medium of claim 7 wherein the attribute of the second storage object comprises information about the second storage object.

9. The storage medium of claim 7 wherein the first storage object comprises one of the following:
a storage node;
a virtual server;
a storage volume; or
a storage aggregate.

10. The storage medium of claim 7 wherein the hierarchical relationship between the first storage object and the second storage object varies based on a type of the first element and the second element.

11. The storage medium of claim 7 wherein the method further causes the machine to:
upon receiving a user request for the feature link, the processor executable management applications uses the mapping data structure to locate the second storage object, request information associated with the feature link from the second storage object, and display the information to the user.

12. The storage medium of claim 7 wherein presenting the tag of the second storage object at the navigation screen for the first storage object comprises displaying to a graphical user interface at least one of the following: a button, a menu item, or a link.

13. A system comprising:
a memory containing machine readable medium comprising machine executable code having stored thereon instructions; and a processor module coupled to the memory, the processor module configured to execute the machine executable code to:
generate a storage hierarchy by a storage operating system of a storage system using a plurality of storage objects, where each storage object represents an element of the storage system including a cluster having a plurality of cluster nodes, a plurality of virtual servers and a plurality of storage volumes for accessing a plurality of storage devices and a storage aggregate representing storage space at the plurality of storage device; wherein the storage hierarchy represents a plurality of relationships between the cluster, the plurality of cluster nodes, the plurality of virtual servers, the plurality of storage volumes and the storage aggregate;

receive a user-defined navigation preference by a processor executable management application to view an attribute of a second storage object representing a second element of the storage system related to a first storage object representing a first element of the storage system within the storage hierarchy defined by a plurality of storage objects; wherein the storage system comprises logical and physical elements represented by the plurality of storage objects for storing and retrieving data from the plurality of storage devices;

create by the processor executable management application a property object for a mapping data structure for storing a hierarchical relationship of the second storage object with the first storage object within the storage hierarchy, based on the user-defined navigation preference;

associate by the processor executable management application the property object with a feature link and a tag at the mapping data structure, where the tag is a notation that the user associates with the attribute of the second storage object; wherein multiple, user defined tags map to the property object to view the attribute of the second object using the feature link; and present by the processor executable management application the tag at a navigation screen defined for the first storage object, where the tag identifies the feature link and the feature link allows navigation to a second navigation screen defined for the attribute of the second storage object based on the stored property object.

14. The system of claim 13 wherein the attribute of the second storage object comprises information about the second storage object.

15. The system of claim 13 wherein the first storage object comprises one of the following:
a storage node;
a virtual server;
a storage volume; or
a storage aggregate.

16. The system of claim 13 wherein the hierarchical relationship between the first storage object and the second storage object varies based on a type of the first element and the second element.

17. The system of claim 13 wherein the machine executable code causes the machine to:
upon receiving a user request for the feature link, the processor executable management applications uses the mapping data structure to locate the second storage object, request information associated with the feature link from the second storage object, and display the information to the user.

18. The system of claim 13 wherein presenting the tag of the second storage object at the navigation screen for the first storage object comprises displaying to a graphical user interface at least one of the following: a button, a menu item, or a link.

19. The machine implemented method of claim 1, wherein an interface layer maintains the mapping data structure that stores the property object indicating a relationship between the first storage object and the second storage object and the interface layer communicates with context specific navigation name links that are not user defined to retrieve information regarding the storage objects.

20. The storage medium of claim 7, wherein an interface layer maintains the mapping data structure that stores the property object indicating a relationship between the first storage object and the second storage object and the interface layer communicates with context specific navigation name links that are not user defined to retrieve information regarding the storage objects.

21. The storage medium of claim 13, wherein an interface layer maintains the mapping data structure that stores the property object indicating a relationship between the first storage object and the second storage object and the interface layer communicates with context specific navigation name links that are not user defined to retrieve information regarding the storage objects.

* * * * *